United States Patent [19]

Roberts, Jr.

[11] 4,177,233
[45] Dec. 4, 1979

[54] METHOD FOR FORMING SIDE-WALL STRIP IN A TIRE

[75] Inventor: Durward T. Roberts, Jr., Fairlawn, Ohio

[73] Assignee: The Firestone Tire & Rubber Company, Akron, Ohio

[21] Appl. No.: 899,954

[22] Filed: Apr. 25, 1978

[51] Int. Cl.² .................... B29H 17/00; B29C 5/04; B29C 9/00
[52] U.S. Cl. .................................. 264/134; 118/408; 156/82; 156/116; 156/242; 264/80; 264/162; 264/246; 264/250; 264/267; 264/310; 427/224; 427/233; 427/236; 427/425
[58] Field of Search ............... 425/110, 113, 404, 11, 425/17, 19, 127; 156/116, 242, 82; 264/162, 250, 267, 236, 347, 326, 36, 80, 161, 264, 129, 310, 246; 152/DIG. 12; 427/233, 236, 425, 224; 118/408

[56] References Cited

U.S. PATENT DOCUMENTS

| | | | |
|---|---|---|---|
| 1,741,997 | 12/1929 | Lerch | 152/DIG. 12 |
| 2,412,429 | 12/1946 | Slingluff et al. | 264/80 |
| 2,739,352 | 3/1946 | Watson | 264/80 |
| 2,960,425 | 11/1960 | Sherman | 264/80 |
| 3,218,208 | 11/1965 | Molen | 156/116 |
| 3,424,836 | 1/1969 | McKelvey et al. | 156/244.11 |
| 3,449,201 | 6/1969 | Palmquist et al. | 156/116 |

FOREIGN PATENT DOCUMENTS

1215829 12/1970 United Kingdom ............... 156/116

*Primary Examiner*—W. E. Hoag

[57] ABSTRACT

Method for making a tire whose white sidewall portion is created by, selectively, providing a circumferential groove in the molded tire, buffing the surfaces of the groove, placing an adhesive in the groove, heating the tire about 138° C. to dry the adhesive, bringing the tire temperature to about 100° C. and, while rotating the tire with the groove in a substantially horizontal plane, directing a stream of white polyurethane stock into the groove by means of an applicator which is formed to direct the stock in differing volumes into the bottom of the groove and laterally against its corners and sides; the white sidewall strip so formed has the shape of a concave meniscus.

8 Claims, 8 Drawing Figures

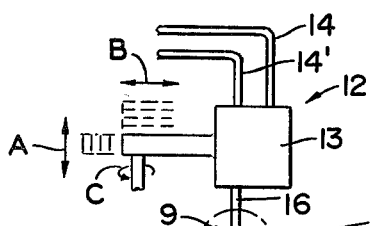
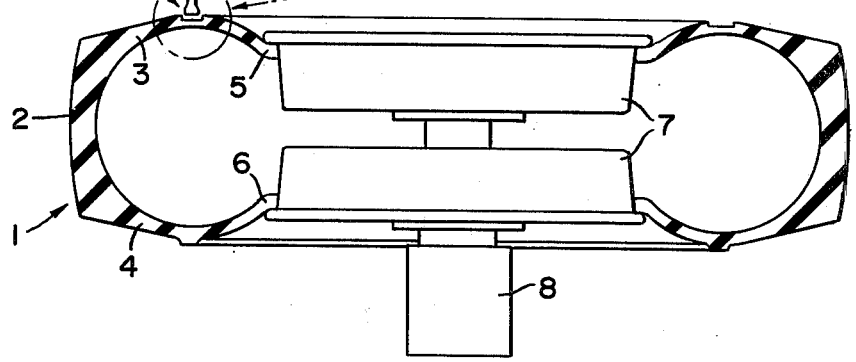
FIG. 1
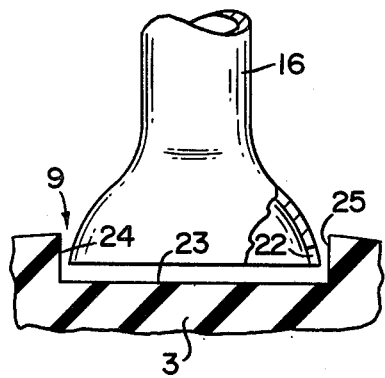
FIG. 2
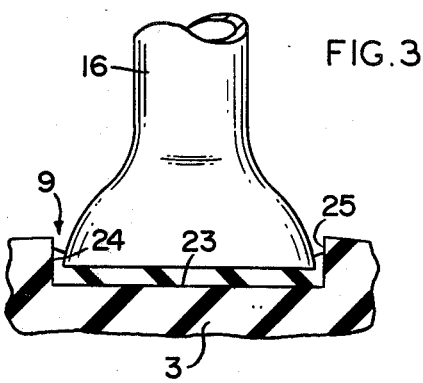
FIG. 3
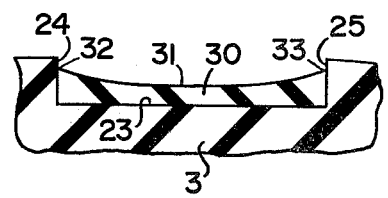
FIG. 4
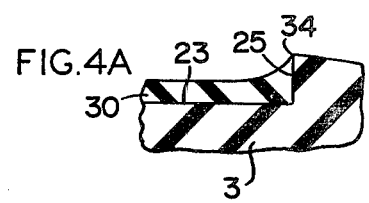
FIG. 4A
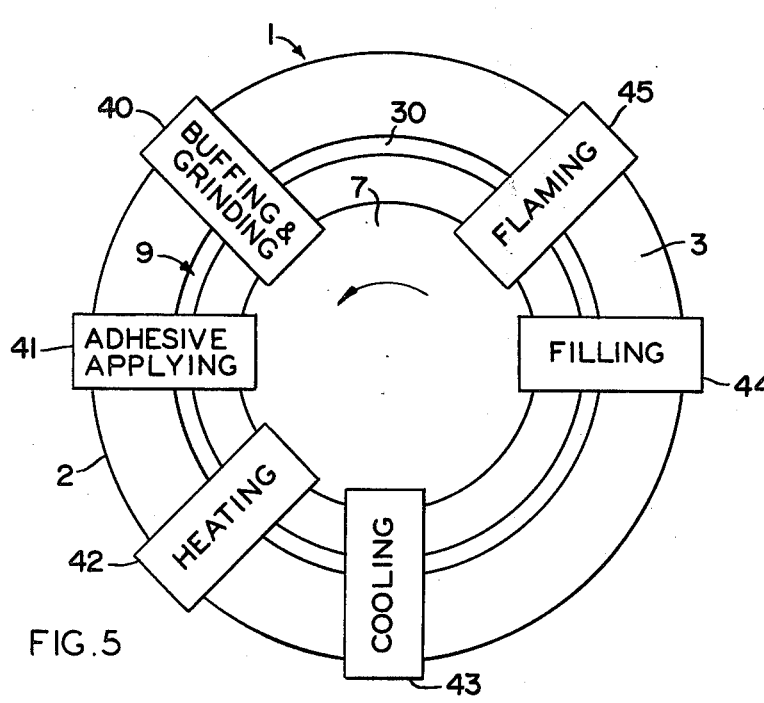
FIG. 5
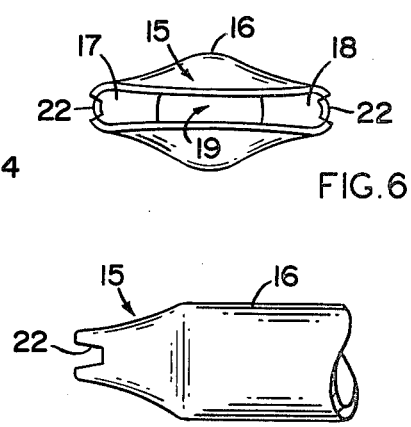
FIG. 6
FIG. 7

METHOD FOR FORMING SIDE-WALL STRIP IN A TIRE

BACKGROUND OF THE INVENTION

The invention relates to a tire having a polyurethane white sidewall especially shaped for resistance to separation.

In the tire art, the white sidewall is most frequently applied to the tire in its uncured state. The handling of light-colored materials in an environment where most other materials are darker has frequently created problems with discoloration of both materials. Sometimes elaborate and costly means have had to be adopted to keep the materials separated during their manufacture, to keep them from mutual discoloration during application to the tire, and to protect the uncured white sidewall while the tire moves to its curing stage. In curing, rubbery stocks tend to flow together, making it difficult at times to maintain the clear black-white demaraction line required. One cure for this problem has been to design the white-black sidewall combination for later grinding of the sidewall; this produces the proper demarcation line, while at the same time performing the necessary cleaning operation on the sidewall to remove stains and dirt picked up during tire-processing, and to bring out the clear white color. To maintain this clear color beyond the manufacturing-stage, and until the tire eventually is in the hands of the customer requires additional cost, materials and labor, such as in the provision of plastic coverings, tire wrappings, or protective paints.

In order to minimize or eliminate the above problems, the present invention provides a means of forming the white sidewall strip directly onto the cured tire, and in such manner that the edge of the sidewall tapers to its juncture with the margin of the containment groove in the black stock of the tire. This method eliminates the handling problems of the uncured stocks and the tires. Additionally, the demarcation line formed by the present method is clear, and concentric with other tire-portions; the white sidewall is resistant to curb-scuffing and separation due to the novel meniscus shape which reduces the strain concentration at the interface between the sidewall strip and tire-groove.

It is therefore an object of the invention to provide a tire manufacturing method wherein a polyurethane stream is applied to a circumferential groove in the sidewall of a cured tire in such a way as to create a sidewall strip resistant to flexing, scuffing, separation, and soiling, and with a clear, decorative demarcation line.

According to this invention, the method comprises molding a tire with a circumferential groove in the sidewall, mounting the tire with the groove lying in a substantially horizontal plane and, while rotating the tire, directing a stream of elastomer stock into the groove, the stock being directed vertically against the bottom surface of the groove and laterally against its sides, in order to produce a sidewall strip having a concave meniscus.

In the prior art, UK patent No. 1,018,035 to Dunlop mentions applying a fluid polyurethane composition onto a cured tire sidewall by spraying, brushing or spreading, or by means of a die, and then allowing the fluid to set, forming a white sidewall; however, no specific method steps are disclosed. U.S. Pat. No. 3,648,748 to Lovell discloses coating a groove in a cured tire with a liquid polyurethane, and then curing the liquid. Again, however, no method is disclosed for applying the liquid polyurethane, nor does the finished coating have the dimensional relationship to the tire groove which is created by the instant method.

BRIEF DESCRIPTION OF THE DRAWINGS

Further objects of the invention will appear by reference to the accompanying drawings in which:

FIG. 1 is a fragmentary sectional view of the tire with the applicator apparatus in place.

FIG. 2 is an enlarged fragmentary side view, partially broken away and in section, of the portion shown encircled at (FIG. 2) in FIG. 1;

FIG. 3 is a view, similar to FIG. 2, showing the application in process;

FIG. 4 is a view, similar to FIG. 3, showing the completed application;

FIG. 4a is a partial view, similar to FIG. 4;

FIG. 5 is a showing of the tire in plan view, with various processing stations schematically shown;

FIG. 6 is a frontal view of the nozzle;

FIG. 7 is a side view of the nozzle.

DESCRIPTION OF A PREFERED EMBODIMENT

Referring to the drawings, a molded tire 1 as shown having tread 2 and sidewalls 3, 4 preferably of a non-staining type, and terminating in inextensible beads 5, 6 is inflated and seated on a chuck 7. The chuck 7 is rotatable by means of motor 8 to maintain sidewall groove 9 in a substantially horizontal plane.

Above the groove 9 is an applicator means 12 comprising chamber 13 mounted for adjustment vertically, laterally, and rotationally, as shown by arrows A, B and C, respectively; representative inlets to the chamber are shown at 14, 15, while outlet for the polyurethane stream into groove 9 is provided through nozzle 16.

Supplies may enter chamber 13 through the inlets 14, 14' for subsequent mixing in the chamber, or a partial mixture may enter. The finished polyurethane fluid mixture is preferably of a non-discoloring type, meaning that it is made of polyols, aliphatic diisocyanates, and curing agents such as diols, triols, aliphatic diamines, or the like. A fluid-consistency similar of that of honey has been found useful, and may be metered through the nozzle 16, or may there exit as a charge.

As shown in FIGS. 2, 6 and 7, the head 15 of nozzle 16 is configured to provide larger openings at its lateral sides 17 and 18 than at its center 19; additionally, the lateral margins of the head are slit as at 22.

As seen particularly in FIGS. 3 and 4, this specially shaped nozzle produces a uniquely configured polyurethane strip 30 in the groove 9, which has a bottom surface 23 and side surfaces 24, 25.

In operation, nozzle 16 directs the stream of polyurethane stock into groove 9, with the stock directed vertically against the bottom surface 23; by virtue of the lateral, enlarged openings 17, 18, increased volumes of stock are directed into the lateral corners of the groove 9, while the slits 22 cause stock to be directed positively laterally against side surfaces 24, 25 of the groove. The result of this application as shown in FIG. 4, is a polyurethane sidewall strip 30 having a concave meniscus extending from the outer margin 32 of one side surface 24 of the groove 9, along a recessed center portion 31, to the outer margin 33 of the other side surface 25. The white sidewall may extend to the top edge 34 of the side surfaces, as seen in FIG. 4a.

By rotating the tire 1 such that the groove remains in a substantially horizontal plane, desirable flow of the polyurethane is maintained in its application.

In addition to the filling or application stage indicated at 44, and shown in FIG. 1, the tire may, selectively, be subjected to various additional steps. For example, as shown in FIG. 5, at 40 the bottom and side surfaces 23, 24, 25 of the tire groove 9 are buffed or ground during rotation of the tire in order to prepare the surfaces and, if necessary, to assure that the groove 9 is concentric with the tire tread 2 or beads 5, 6. A rubber-to-polyurethane adhesive is applied at 41, and is dried at 42 by heat applied up to about 138° C. At 43 the tire is cooled to approximately 100° C. At the filling or application station 44, the tire is rotated, while the polyurethane stream is directed into the groove. Any gas- or air-bubbles appearing in the polyurethane surface may immediately be removed by applying a flame briefly, as at station 45.

The setting up of the white polyurethane sidewall may be accelerated by subjecting it to an additional heat application such as at station 42.

It will be apparent that changes and modifications may be made in the invention by those skilled in the art without deviating from the scope of the invention.

What is claimed is:

1. The method of manufacturing a tire which comprises
    providing a tire with a sidewall having a circumferential groove therein,
    mounting said tire with said groove lying in a substantially horizontal plane and, while rotating said tire,
    applying a major portion of a fluid stream of elastomer into the corners of said groove,
    and positively directing lateral portions of the stream against the side surfaces of said groove, forming a strip in said sidewall having a concave meniscus.

2. The method of claim 1, and heating the tire to about 100° C.

3. The method of claim 1, and the further step of directing a flame against the elastomer, to smooth its surface.

4. The method of claim 1, and the further step of buffing the bottom and side surfaces of said groove.

5. The method of claim 4, and the further step of applying an adhesive to the buffed groove-surfaces.

6. The method of claim 5, and the further steps of heating the tire to dry said adhesive, and thereafter cooling the tire to about 100° C.

7. The method of claim 6, wherein said heating proceeds to about 138° C.

8. The method of manufacturing a tire which comprises
    providing a tire with a tread portion and sidewalls terminating in inextensible beads, a said sidewall having a groove therein concentric with said beads,
    mounting and rotating said tire with said groove lying in a substantially horizontal plane,
    buffing the bottom and side surfaces of said groove,
    applying an adhesive to said surfaces,
    heating the tire to about 138° C. to dry said adhesive,
    cooling the tire to about 100° C. and, while continuing to rotate said tire, inserting a nozzle into said groove and
    applying a major portion of a stream of liuid polyurethane into the corners of said groove,
    and positively directing lateral portions of the stream against the side surfaces of said groove, and immediately thereafter directing a flame against said polyurethane to smooth the surface thereof, heated surfaces of the groove causing the polyurethane to set up and produce a strip extending in a concave meniscus from the outer margin of one side surface of the groove to the outer margin of the opposing side surface of the groove.

* * * * *